United States Patent [19]

Lutz

[11] 4,052,083

[45] Oct. 4, 1977

[54] LOAD BRACING DEVICE

[76] Inventor: David Edward Lutz, 300 Washington Lane, Carlisle, Pa. 17103

[21] Appl. No.: 542,987

[22] Filed: Jan. 22, 1975

Related U.S. Application Data

[63] Continuation-in-part of Ser. No. 458,384, April 5, 1974, abandoned.

[51] Int. Cl.² ............................................. B60P 7/14
[52] U.S. Cl. ............................... 280/179 R; 105/491; 105/496
[58] Field of Search ..................... 280/179 R, 179 B; 105/489, 490, 491, 493, 496

[56] References Cited

U.S. PATENT DOCUMENTS

| | | | |
|---|---|---|---|
| 3,062,157 | 11/1962 | Woods | 280/179 B |
| 3,345,955 | 10/1967 | Erickson | 280/179 R X |
| 3,673,968 | 7/1972 | Bertram | 105/496 |
| 3,791,311 | 2/1974 | Loomis | 105/491 |
| 3,795,202 | 3/1974 | Johansson | 105/376 X |
| 3,836,174 | 9/1974 | Holman, Jr. | 280/179 R |

*Primary Examiner*—Joseph F. Peters, Jr.
*Assistant Examiner*—Michael J. Forman
*Attorney, Agent, or Firm*—Edward E. Dyson; John J. Byrne

[57] ABSTRACT

A parallelogram load-bracing device particularly useful for bracing loads in trucks when the load consumes less than the space available in the truck. The device is suspended from the roof of the truck and includes a parallelogram frame having laterally movable load-engaging members attached thereto. The device is constructed in sections such that the device can be readily lengthened by adding additional sections. A single actuating means is located at one end of the device for expanding and contracting the device into and out of engagement with the load to be braced. Alternate embodiments include mounting laterally moving load-engaging members on the interior side walls of the truck.

6 Claims, 20 Drawing Figures

Fig. 10
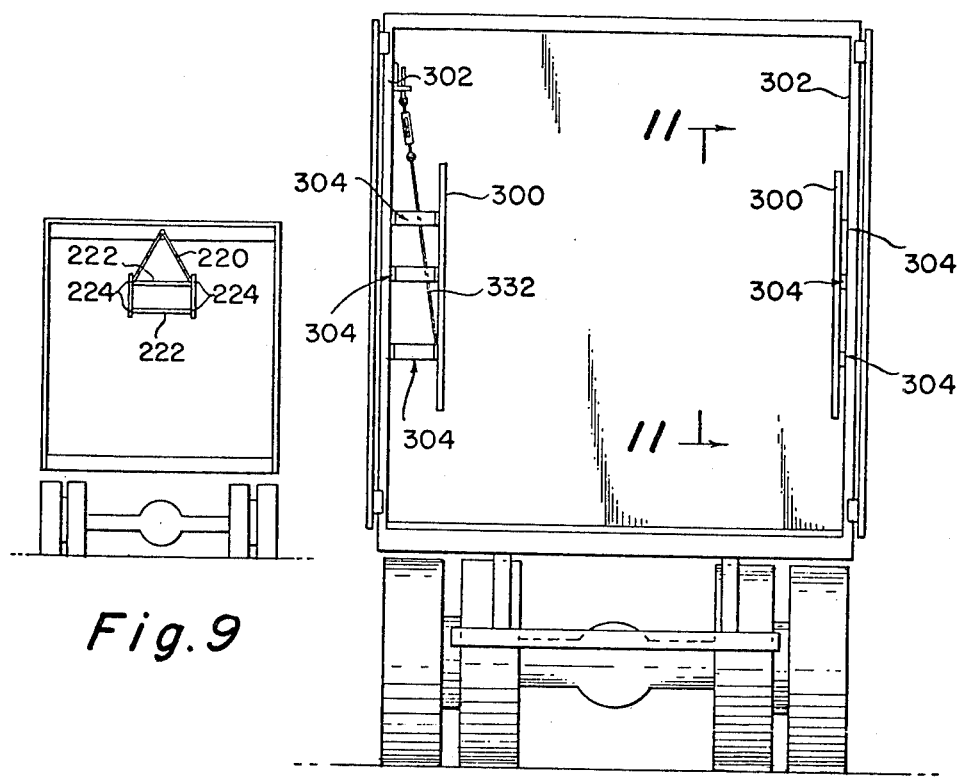
Fig. 9
Fig. 13
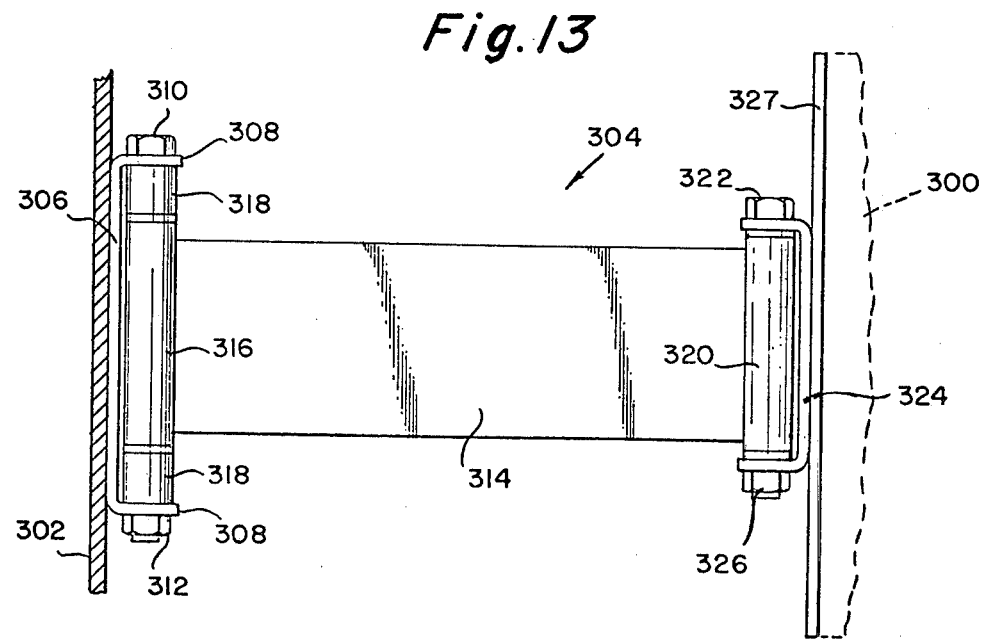

LOAD BRACING DEVICE

This application is a continuation-in-part of copending application Ser. No. 458,384, filed Apr. 5, 1974, entitled LOAD BRACING DEVICE, now abandoned.

BACKGROUND AND FIELD OF THE INVENTION

This invention relates to a parallelogram, load-bracing device particularly useful in vehicles.

It is the rule rather than the exception that vehicles carry less than a full load most of the time and unless the loads are braced in some manner they are subject to damage when the truck lurches, goes around corners or has to stop suddenly. Even where the vehicle is fully loaded, gaps usually exist within the loads. For example, most shipping is done today on pallets, usually arranged in two longitudinal rows in the vehicle, with a gap between the two rows. The device of this invention is particularly useful in the latter situation.

There have been numerous attempts in the prior art to provide an inexpensive and easily operated load-bracing device which may be employed in existing vehicles with a minimum amount of alteration. This invention constitutes an improvement over those prior art devices in providing a load-bracing device which is more easily operated and more versatile than known devices. It is an objective of this invention to provide a simplistic and easily installed load-bracing device primarily useful for bracing loads in mobile vehicles such as trucks, airplanes and railroad cars.

More particularly, it is an objective of this invention to provide a load-bracing device which is constructed in sections such that sections may be readily added and deleted to vary the length of the load-bracing device rendering it useful in areas of different sizes.

It is a further objective of this invention to provide a single actuator for the load-bracing device at one end thereof which is operable regardless of the number of sections added to the device.

It is a further objective of this invention to provide a load-bracing device which may be suspended from a roof of a load-carrying vehicle and which consumes a relative small amount of space when in inoperative or contracted positions.

It is to be understood that the load-bracing device of this invention is not limited for use in a mobile environment such as a vehicle or the like, but is equally adaptable for use in any confined storage space.

SUMMARY OF THE INVENTION

The load-bracing device of this invention comprises a parallelogram arrangement including a pair of load-engaging members spaced laterally from each other and extending longitudinally of the vehicle. A plurality of connecting bars extend generally transversely between and are pivotally connected at opposite ends thereof to the load-engaging members at points spaced along the lengths of the members. Vertical rods or cables suspended from the ceiling or extending up from the floor support the transverse bars for rotational movement about vertical axes and suspend the load-engaging members between a wall and the load or between aligned rows of palletized loads. Simultaneous and uniform rotation of the transverse bars will cause the load-engaging members to move toward and away from each other in a contracting and expanding parallelogram configuration. A single actuator means is located at one end of the device whereby the device is made to expand and contract into and out of engagement with the loads to be braced. The actuator means comprises a diagonally extending flexible strap, chain or cable running from one load-engaging member to the other and a ratchet operated reel which is used to shorten or lengthen the strap thereby causing the load-engaging members to expand and contract in a parallelogram fashion. Load-engaging members are constructed in sections such that additional sections may be readily added or deleted to lengthen or shorten the device. The suspension point may be movable to adjust the center-line location of the device to either accommodate loads of different widths or to move it to the wall and out of the way. Modified forms of the load-bracing device of this invention include laterally movable load-engaging members which are mounted on the side walls of the truck. The members are movable toward the longitudinal center line of the truck and are parallelo thereto. Prior art illustrative of an arrangement of this type is disclosed in U.S. Pat. No. 3,345,945 to Erickson, dated Oct. 10, 1967, and entitled WALL FILLERS.

BRIEF DESCRIPTION OF THE DRAWINGS

FIG. 9 is an end view in elevation of a modified form of the suspension means for the load-bracing device of this invention;

FIG. 10 is a rear view of a modified form of the load-bracing device of this invention;

FIG. 13 is a side elevational view of a typical hinge;

Referring now to FIGS. 1 through 4, the load-bracing device 10 of the invention is shown installed in a vehicle 12 and, more particularly, in the trailer of a tractor trailer rig. Generally, the load-bracing device of this invention operates on the principle of a parallelogram and moves from a contracted position shown in FIGS. 1 and 3 to an expanded, load-engaging position shown in FIGS. 2 and 4. In the preferred embodiment, the load-bracing device 10 is suspended from the roof 14 of the vehicle 12 though it is to be understood that where required, the load-bracing device could be installed and supported in another manner. For example, the device could be supported on standards extending upwardly from the floor 16 of the vehicle. The device 10 provides a pair of longitudinally extending load-engaging members 18 and 20 which are substantially identical in construction and will be described in greater detail below.

Figure 1:
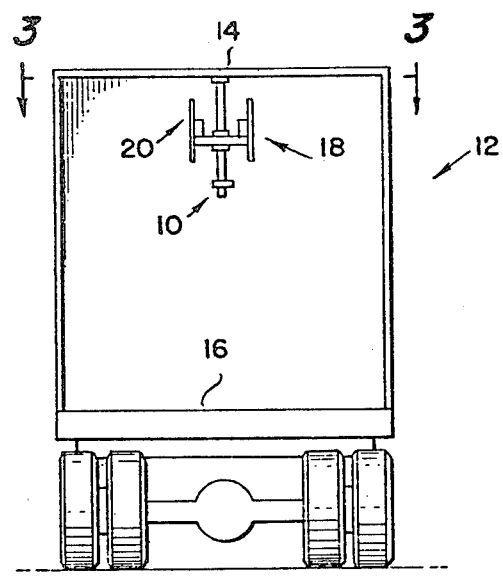
FIG. 1 is an end view in elevation showing the load-bracing device of this invention installed in a truck and in the contracted position.
Figure 2:
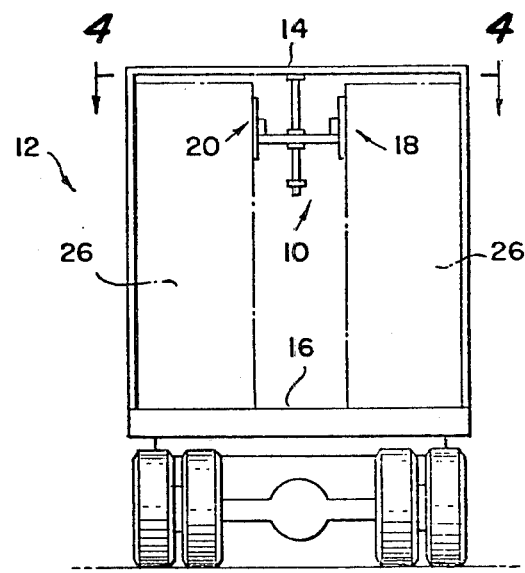
FIG. 2 is a view similar to FIG. 1 showing the load-bracing device in the expanded position.
Figure 3:
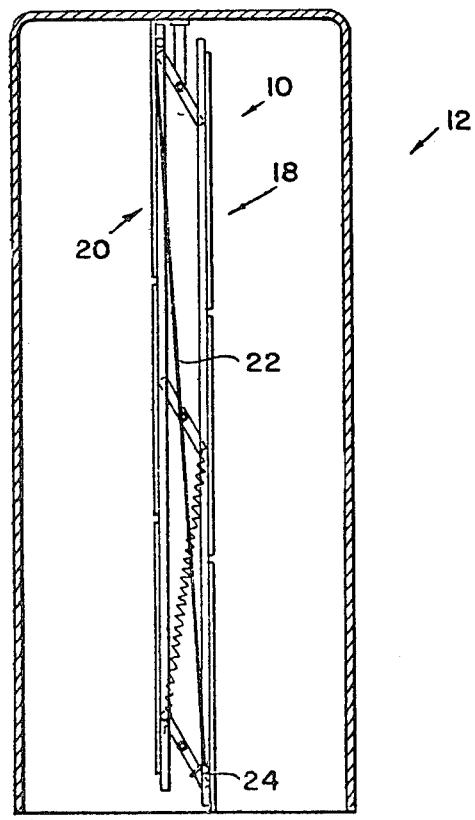
FIG. 3 is a cross-sectional view taken on lines 3—3 of FIG. 1.
Figure 4:
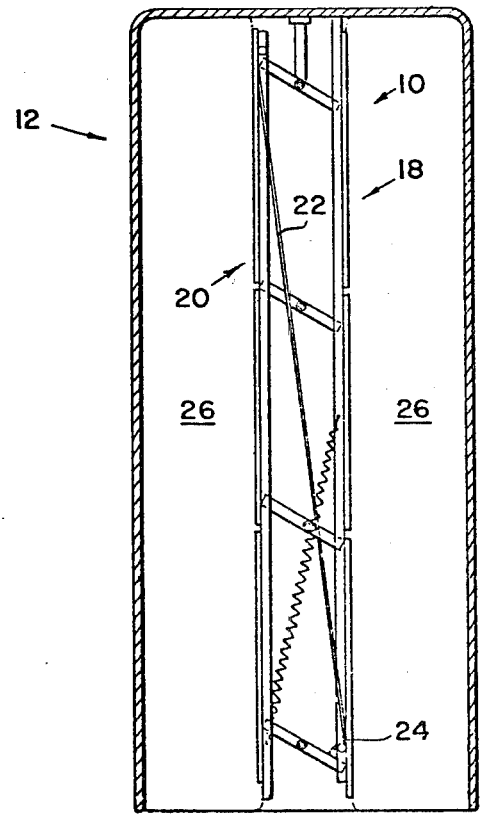
FIG. 4 is a cross-sectional view taken on lines 4—4 of FIG. 2.

The actuating means for moving the load-engaging members from the contracted position shown in FIGS. 2 and 3 to the expanded position shown in FIG. 4 comprises a flexible strap 22 and a reel 24 at one end of the device. By lengthening and shortening the strap 22, the load-engaging members are caused to expand and contract. The manner in which a load may be braced by the device of this invention is illustrated in FIG. 2 wherein loads 26 such as pallet loads and the like are indicated in dotted-line configuration. The loads 26 are forced against the side walls of the vehicle and braced thereagainst, when the load-bracing device 10 is expanded.

Figure 5:
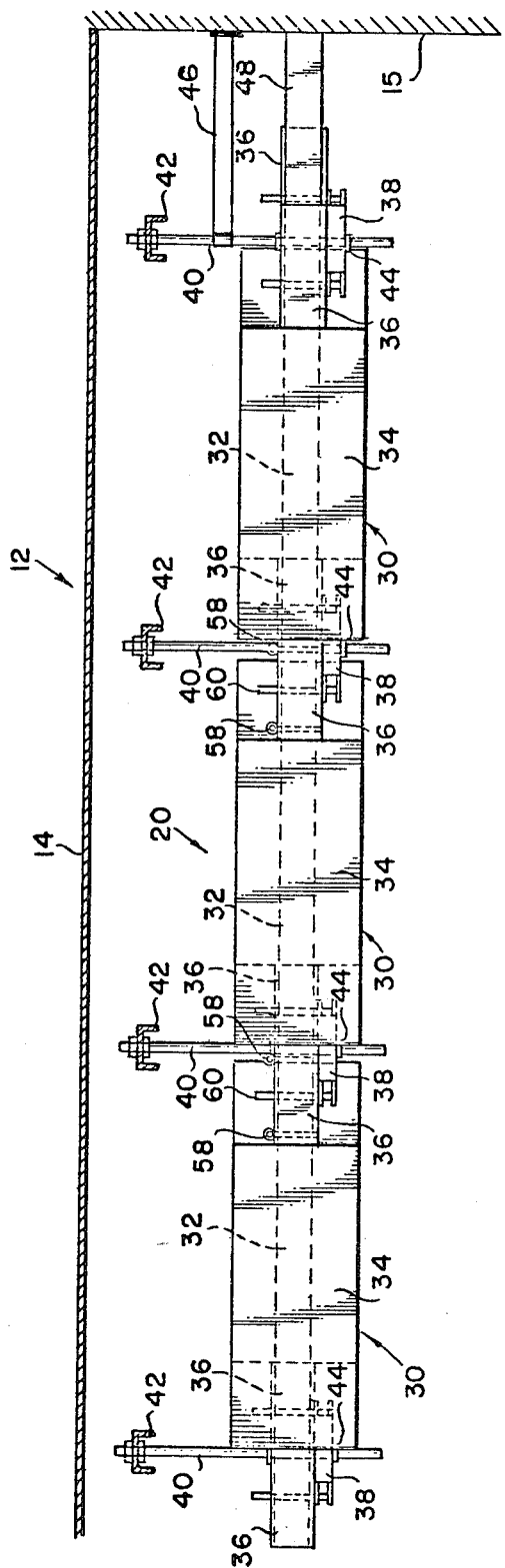
FIG. 5 is a side view in elevation of the load-bracing device of this invention.
Figure 6:
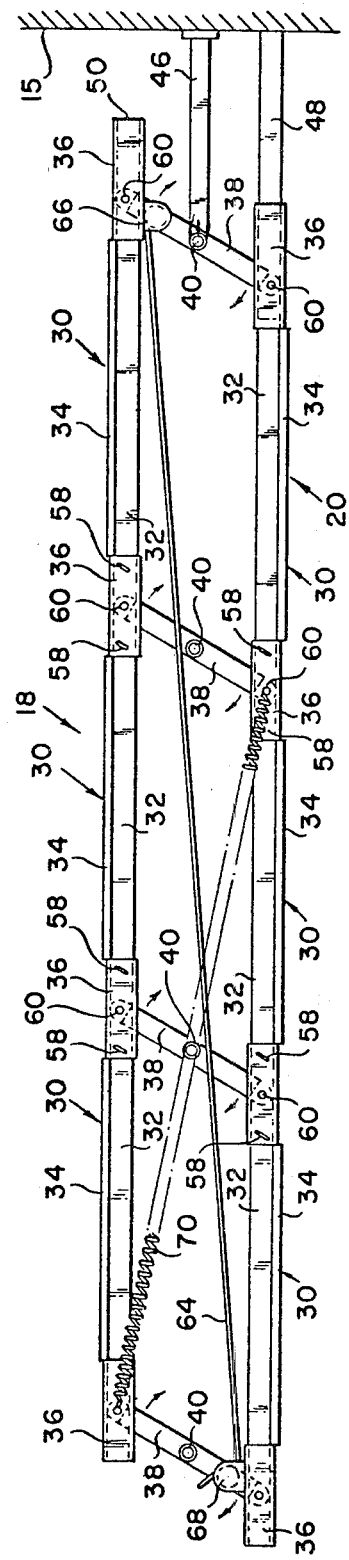
FIG. 6 is a plan view of the load-bracing device of this invention.

The load-engaging members of the device of this invention are best illustrated in FIGS. 5 and 6. Each elongated load-engaging member 18 and 20 comprises a plurality of joined-together sections 30 each, in turn, comprising a bar 32 having a vertically extending panel 34 attached to the load-engaging side thereof. The bars 32 are joined together by hollow coupling members 36 which are open at each end and receive the adjacent ends of the bars 32 to be connected. The bars 32 can be either of wood, such as 2 × 4's or the like, or can be of metal, such as fabricated channel bars. The coupling members 36 are preferably of a rather sturdy metal. The elongated load-engaging members 18 and 20 are joined together in parallelogram fashion by means of transverse bars 38. Each transverse bar 38 has a coupling member 36 pivotally attached at each end thereof.

The transverse bars are in turn rotatably mounted on vertical rods 40 suspended from beams 42 on the underside of the ceiling 14 of the vehicle 12. The vertical bars can be readily attached to existing structural supporting beams present in the ceilings of most vehicles or additonal structural elements can be added with a minimum of effort. The rods extend through openings at the midpoint of the transverse bars and are provided with bearing members 44 which support the transverse bars for rotating movement about vertical axes. At this point, it can be seen that by rotating the transverse bars 38 simultaneously and uniformly about the axes of the vertical rods 40, the load-engaging members 18 and 20 will be caused to move angularly and laterally in parallelogram fashion to expand and contract the width of the device. In this manner, the load-engaging members are caused to move into and out of engagement with the loads to be braced. The rods have adjustment apertures therein wherein the load-engaging means may be vertically adjusted relative to the height of the loads.

As best seen in FIG. 6, a stabilizing bar 46 is connected at one end to the front end 15 of the vehicle 12 and is connected at the other end to the nearest most vertical rod 40. This helps maintain the load-bracing device stable, particularly when the device is out of the load-engaging position. A stop 48 is provided on one of the longitudinal members and engages the front wall 15 of the vehicle to limit the rotational movement of the transverse bars and, therefore, limit the degree of expansion of the load-engaging members. In this manner, the load-engaging members are prevented from traveling beyond the over-the-center point. Likewise, in the retracted position, the end 50 of the other load-engaging member 18 engages the end wall 15 to further stabilize the device.

Figure 7:
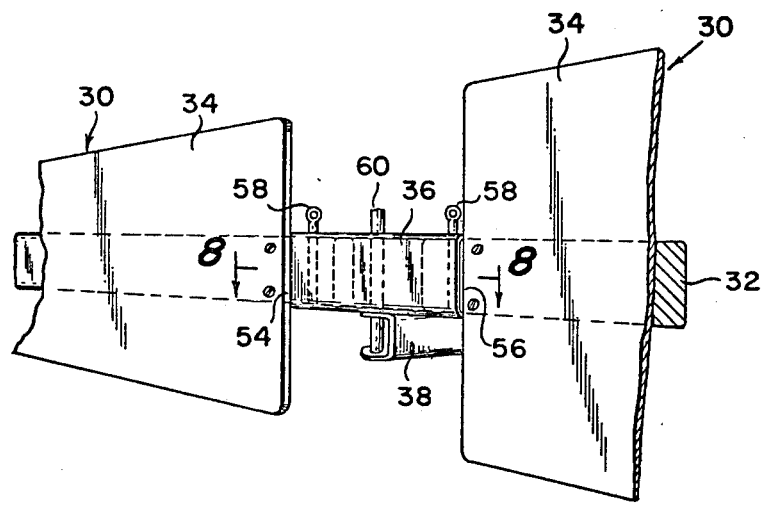
FIG. 7 is a fragmentary perspective view illustrating the coupling member which connects adjacent sections of the load-engaging members of the load-bracing device of this invention.
Figure 8:
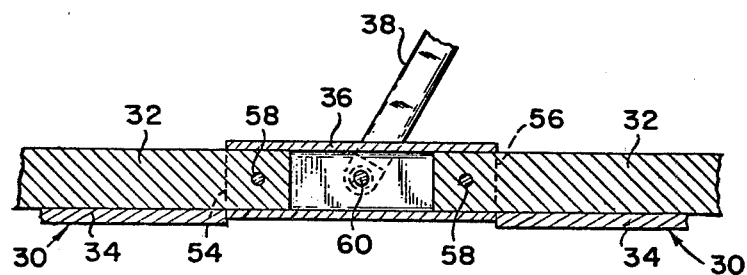
FIG. 8 is a cross-sectional view taken on lines 8—8 of FIG. 7.

The coupling member 36 is more clearly illustrated in FIGS. 7 and 8, and, as indicated earlier, comprises a hollow member having open ends 54 and 56 which receive adjacent ends of the bars 32. To insure that the bars will remain in coupled relationship, locking pins 58 extend through openings in the coupling member 36 and registered openings in the ends of the bars 32. The coupling member is pivotally attached to the transverse bar 38 by means of an upstanding pivot pin 60, which is fixedly mounted in the end of the transverse bar 38 and which extends upwardly through openings in midpoint of the coupling member 36.

The load-bracing device of this invention is caused to expand and contract by actuating means comprising a flexible strap 64, much like a seat belt strap, which extends diagonally across the device from one load-engaging member to the other, as shown in FIG. 6. A cable or chain may be substituted for a strap. The strap is anchored at 66 at the front end of the vehicle and is wound onto a reel 68 at the rear end thereof. When the diagonal distance covered by the strap 64 is shortened by winding the strap on the reel 68, the transverse bars 38 will rotate in a counterclockwise direction thereby expanding the load-engaging members 18 and 20 into load engagement. The device is maintained in the expanded load-engaging position by locking the reel. When it is released, the strap will be free to extend, and a coiled spring 70 which extends from one load-engaging member to the other in a diagonal opposite that of the strap 64 will cause the device to automatically seek the retracted position. In lieu of the reel, a hydraulic actuator can be employed to shorten or lengthen the strap.

In FIG. 6, the strap is shown extending the full length of the device. It can, of course, extend only from the end of the device to perhaps the middle of the member 18. Additionally, the device may be operated manually without employing a strap, if desired. Further, as can readily be seen, the device of this invention can be extended in length merely be adding additional sections. Such extension of length will not require any further modification of the actuation means. This constitutes a substantial improvement over the prior art which generally includes devices which are not extendable longitudinally, and in any event are not extendable in such a manner that the same single actuating means can be used regardless of the extension sections added.

The embodiment shown in FIG. 9 operates substantially like that shown in the earlier drawings except that a cable 220 in the form of an inverted V is used as the suspension means for the load-engaging members. Further, upper and lower rows of transverse bars 222 are used for increased stability. It is to be understood that the bars 222 are pivoted at their ends 224 to load-engaging members, and the entire device is collapsed and opened in the manner described for the other embodiments; namely, by a cable, chain or flexible strap and reel combination. A suitable return spring is provided to urge the load-engaging members to the collapsed or closed position.

Another variation of the load-bracing device of this invention is shown in FIGS. 10 through 18. In this embodiment, the load-engaging members are swingably attached to the side walls of the vehicle and compact the load toward the center. It is to be understood that the height of the load-engaging members and the relative disposition of the load-engaging members with respect to the height of the truck may be varied according to the type of load. The load-engaging members are indicated by the numeral 300 and are mounted on the side walls 302 of the truck for lateral parallelogram type movement toward the longitudinal center line of the truck. The load-engaging members 300 comprise either a single panel or a plurality of panels joined to form a single elongated panel extending substantially the full length of the truck. The panels are mounted to the side walls 302 of the truck by upper and lower rows of hinge elements 304. The hinge elements are shown in greater detail in FIG. 13.

A channel member 306 extends substantially the full length of the truck, or at least the length of the load-engaging member 300, and is affixed to the side wall 302 of the vehicle. It is to be understood that in the preferred embodiment, there are four channel members attached to the side walls of the vehicle, two on each side, for the upper and lower hinge elements respectively. The legs 308 of the channel member are provided with apertures spaced longitudinally of the members for receiving hinge pins or bolts 310 which are secured in place by nuts 312. The hinge strap 314 is loosely journaled on the bolt or hinge pin 310 by means of integrally joined hollow tubular member 316. Spacer elements 318 properly position the integrally attached tube 316. A similar tubular element 320 is integrally affixed to the opposite end of the hinge strap 314 and is likewise loosely journaled on a bolt or hinge pin 322 which is suitably secured in channel member 324 by means of nut 326. The channel members 324 are integrally joined to an attaching plate 327 which in turn is affixed to the rear side of the load-engaging members.

Figure 11:
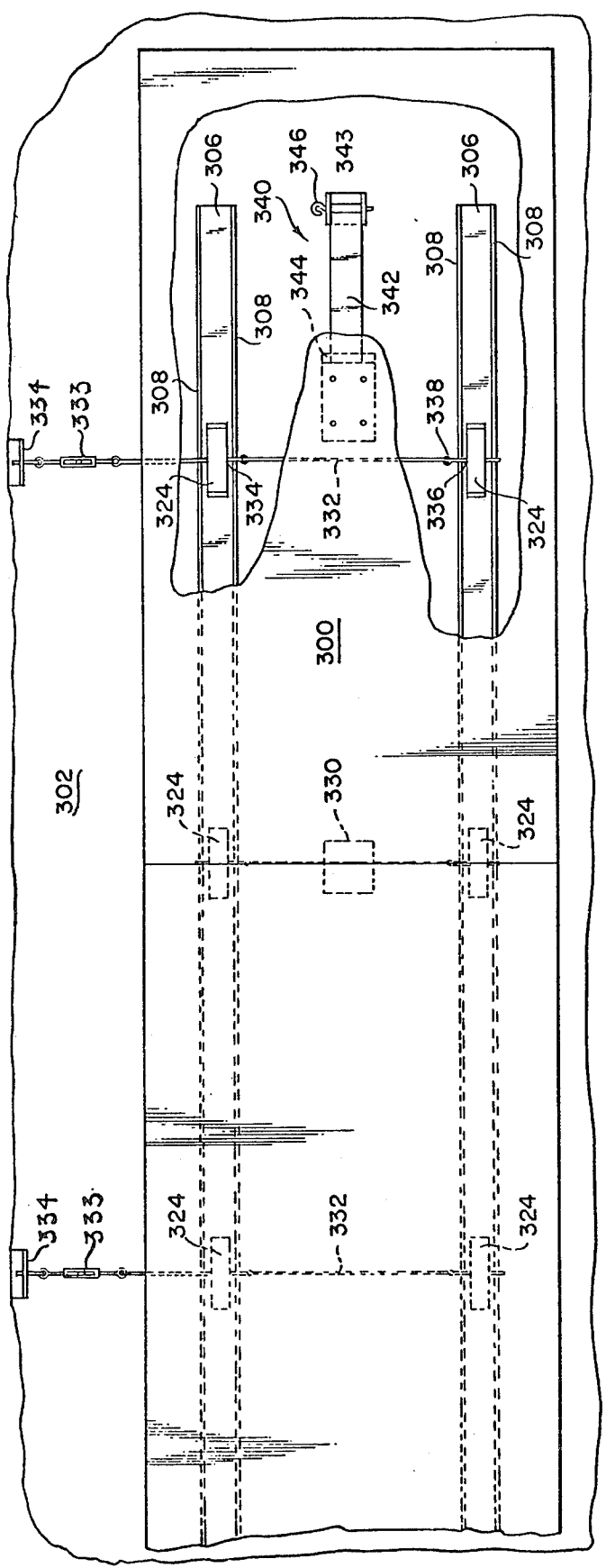
FIG. 11 is a fragmentary side elevational view taken in the direction of the arrows 11—11 of FIG. 10.
Figure 12:
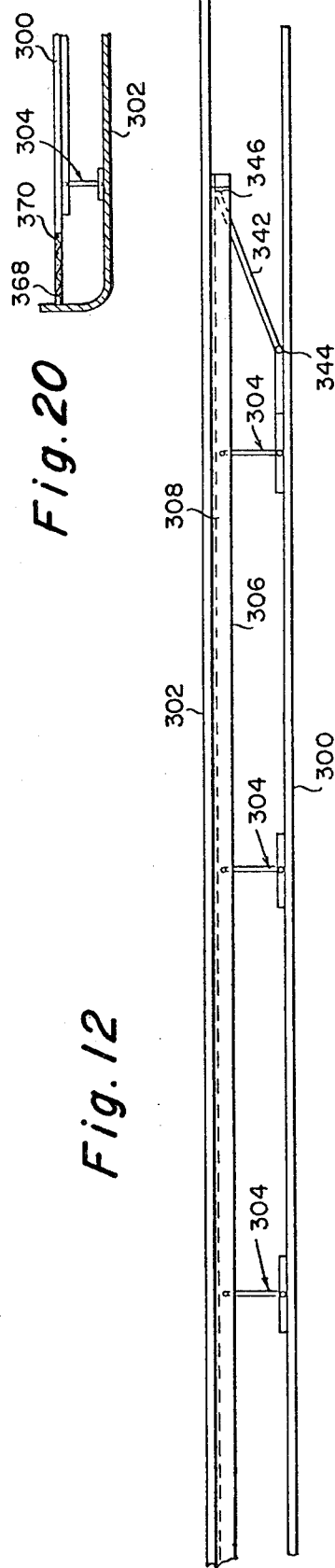
FIG. 12 is a top plan view of FIG. 10.
Figure 14:
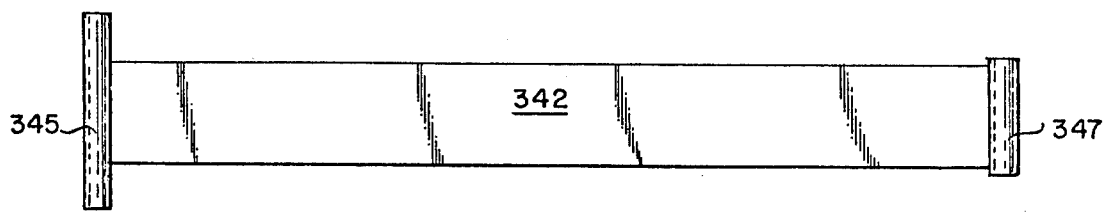
FIG. 14 is a side elevational view of one of the rear locking hinge.
Figure 15:
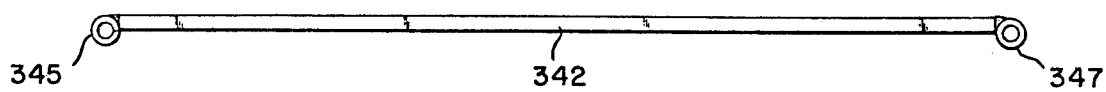
FIG. 15 is a top plan view of the locking hinge shown in FIG. 14.

FIG. 11 shows the load-engaging member 300 which comprises a series of panels joined along their vertical edges by connecting plate 330. FIG. 12, further illustrates the positioning of the hinge elements 304 relative to the load-engaging members 300 and the side walls 302.

To aid in support of the load-engaging members and to relieve the hinge members 304 from undue stress, supporting cables 332 are spaced longitudinally of the load-bracing device and are attached at their upper ends to the side wall of the vehicle at 334 and extend downwardly to the outer end of a respective hinge member 304 and are affixed at 336. Each cable is provided with a turn buckle 333 which permits the effective length of the supporting cable to be adjusted. It is readily seen that the use of these supporting cables aid in supporting the weight of the load-engaging members to relieve the hinge members from undue stress.

The load-bracing device of FIGS. 10 through 12 is swung into load-bracing position by pulling the elongated load-engaging members 300 toward the rear of the vehicle. This can be done either manually or by use of a flexible strap or cable and reel arrangement disclosed with the embodiment of FIGS. 1 through 8. Of course, the load-engaging members can be mounted such that they are collapsed when swung toward the rear and expanded when pushed toward the front. The load-engaging members are locked in the expanded position by means of a locking device generally indicated by numeral 340 and shown in FIGS. 11, 12, 14, and 15. The locking device 340 consists of a metal strap or bar 342 having tubular pin-receiving elements 345 and 347 on the ends thereof. The element 345 is pivotally attached at the rear section of member 300 by means of a bracket 344. The other end is received in a bracket 343 on the side wall of the vehicle and is attached thereto by means of a pin 346. In this manner, the rigid bar locks the member 300 in the expanded position. The load-engaging members may be collapsed toward the side walls be merely removing the pins 346 and swinging the load-engaging members obliquely toward the front of the vehicle and toward the side walls.

Figure 16:
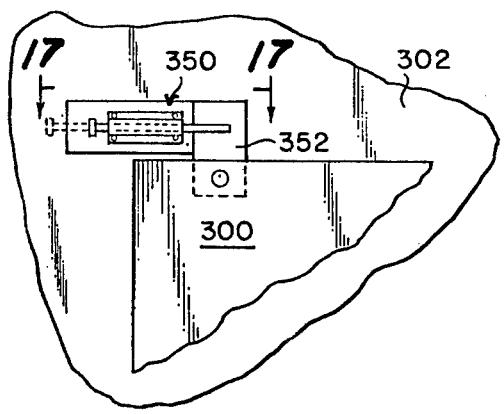
FIG. 16 is a fragmentary side elevational view showing the latch means used to hold the load-engaging members in collapsed position.
Figure 17:
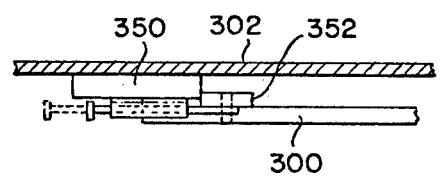
FIG. 17 is a sectional view taken on lines 17—17 of FIG. 16.
Figure 19:
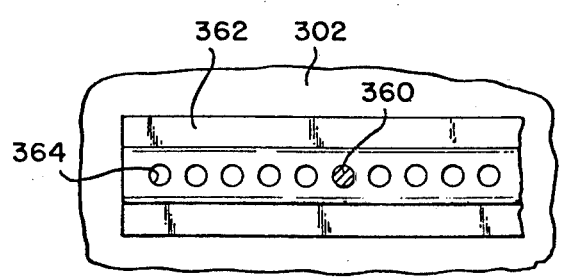
FIG. 19 is a sectional view taken along lines 18—18 of FIG. 18.
Figure 18:
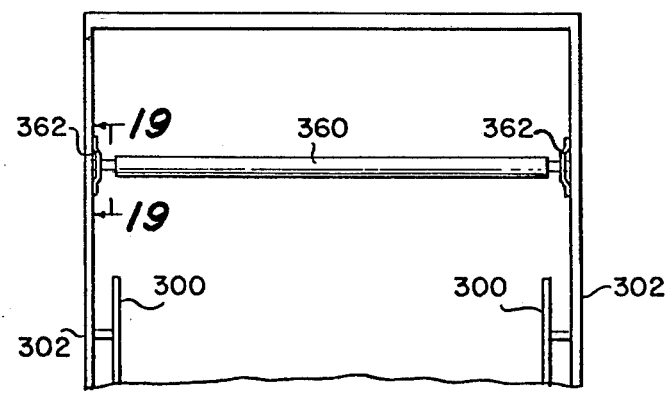
FIG. 18 is a partial rear elevational view showing the transverse bracing bar.

A latching device may be employed to maintain the load-engaging members in the collapsed position. An illustrative latch is shown in FIGS. 16 and 17, and includes a slidable bolt-type lock 350 of standard configuration, which is affixed to the side wall 302 of the vehicle. Upstanding latching plate 352 is affixed to load-engaging member 300 and is engaged by the slidable bolt to maintain the load-engaging members in a collapsed position up against the side walls 302. It is to be understood that any suitable latching mechanism may be employed.

In the event that the load does not occupy the full length of the vehicle, a bracing bar 360 is adjustably positioned against the rear of the load by means of a side wall mounted brackets 362, each of which includes a plurality of apertures 364 into which a bracing bar 360 may be placed. In this manner, loads which occupy less than the full length of the vehicle will be suitably braced against longitudinal movement. Accordingly, the loads are stabilized against longitudinal as well as lateral movement within the vehicle by means of the use in combination of the side wall bracing elements and the bracing bar 360.

Figure 20:
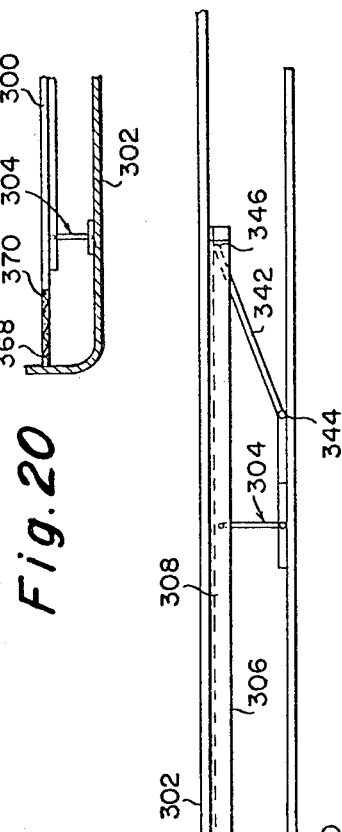
FIG. 20 is a fragmentary plan view of the front end of one of the load-engaging members.

Finally, a canvas panel (or suitable flexible straps or the like) 368 spans the gap between the leading edge 370 of the load-engaging members and the front wall of the vehicle as seen in FIG. 20. The purpose of flexible member 368 is to prevent cargo from falling between the ends 370 and the front end of the vehicle thereby possibly interfering with the collapsing of the load-engaging members. The flexible member 368 serves the additional purpose of limiting the movement of the load-engaging member when expanded to prevent it from going past the over-the-center position.

In a general manner, while there has been disclosed an effective and efficient embodiment of this invention, it should be well understood that the invention is not limited to such an embodiment as there might be changes made in the arrangement, disposition, and form of the parts without departing from the principle of the present invention as comprehended within the scope of the accompanying claims.

I claim:

1. A load-bracing device for use in a load-carrying vehicle having side walls comprising at least one means mounted on one of the side walls of said vehicle for engaging and bracing a load, said load-engaging means comprising an elongated load-engaging member, hinge means connecting said load-engaging member to said one side wall for movement toward and away from said wall in parallelogram fashion and between a collapsed position and an expanded position, means for maintaining said load-engaging member in the expanded position, and a flexible panel connected at one end to the front end of the vehicle and at the other end to the end of the load member adjacent to said front end, said panel preventing objects from lodging between said front end and said adjacent end of said load-engaging member.

2. The device of claim 1 and including flexible suspension means extending between said side walls and said load-engaging means for assisting said hinge means in supporting said load-engaging means.

3. The device of claim 1 and including a second load-engaging means mounted on a side wall opposite said one side wall.

4. The device of claim 3 wherein each of said hinge means comprises an elongated rigid strap pivotally connected at one end to a side wall and at its other end to a load-engaging member, said hinge means being disposed at spaced points along said side walls and in upper and lower rows.

5. The load-bracing device of claim 3 wherein said means for maintaining said load engaging member in the expanded position comprises a rigid bar which is disposed between a side wall and a load-engaging member when the latter is in the expanded position.

6. The load-bracing device of claim 3 and including latch means for latching said load-engaging means in the collapsed position.

* * * * *